US007571944B2

(12) United States Patent
Mortensen

(10) Patent No.: US 7,571,944 B2
(45) Date of Patent: Aug. 11, 2009

(54) SAFETY AND RESCUE CARABINER HOLDER

(75) Inventor: Stephen Mortensen, Vernal, UT (US)

(73) Assignee: Quasar Services, Vernal, UT (US)

(*) Notice: Subject to any disclaimer, the term of this patent is extended or adjusted under 35 U.S.C. 154(b) by 34 days.

(21) Appl. No.: 11/800,870

(22) Filed: May 7, 2007

(65) Prior Publication Data

US 2008/0012367 A1 Jan. 17, 2008

Related U.S. Application Data

(60) Provisional application No. 60/831,719, filed on Jul. 17, 2006.

(51) Int. Cl.
*B25J 1/04* (2006.01)

(52) U.S. Cl. ...................................... 294/19.1; 248/925

(58) Field of Classification Search .................. 294/1.1, 294/19.1, 24; 114/221 R; 248/925
See application file for complete search history.

(56) References Cited

U.S. PATENT DOCUMENTS 1,536,701 A 5/1925 Buckingham et al.
4,793,646 A * 12/1988 Michaud, Jr. .............. 294/19.1
5,415,446 A * 5/1995 Olson et al. ................ 294/19.1
5,622,399 A * 4/1997 Albright ...................... 294/24
5,820,181 A * 10/1998 Le Noach .................. 294/19.1
6,409,240 B1 * 6/2002 Ferguson ................... 294/19.1
6,412,432 B1 * 7/2002 White et al. ............ 114/221 R
6,510,599 B2 1/2003 AmRhein
7,036,780 B1 5/2006 Geninatti
2002/0148093 A1 10/2002 AmRhein
2005/0183904 A1 8/2005 Bacalso
2005/0275230 A1 12/2005 Barrett

OTHER PUBLICATIONS

Mountaintools "Bouldering & Top Roping," www.mtntools.com/cat/boulder/trangosquid.htm Jun. 6, 2006.
Epic Sport Innovative Products for Outdoor Enthusiasts, Stick Clip, www.epicsport.com, printed from website Apr. 17, 2006; 6 pgs.

* cited by examiner

*Primary Examiner*—Dean J Kramer
(74) *Attorney, Agent, or Firm*—Thorpe North & Western LLP

(57) ABSTRACT

A safety and rescue carabiner holder for securing a carabiner with its gate in the open position while extending the user's reach several feet in any direction, which is also capable of supporting a long and heavy segment of attached safety rope. The carabiner holder is mounted to the end of an extension pole and includes a restraining structure that grips the bottom of the carabiner and a set of spring-loaded jaw arms that firmly clamp the spine and gate arm of the carabiner in a manner strong enough to withstand any inadvertent shaking and bouncing, ensuring that the carabiner will stay in place until hooked into a target ring and the user releases the carabiner by pulling backwards on the extension pole.

18 Claims, 4 Drawing Sheets

SAFETY AND RESCUE CARABINER HOLDER

RELATED APPLICATIONS

This application claims priority to U.S. Provisional Application Ser. No. 60/831,719, filed Jul. 17, 2006, which is incorporated by reference in its entirety herein.

FIELD OF THE INVENTION

The field of the invention relates to safety and rescue operations and, more specifically, to the installation of a carabiner with its attached safety rope to the D-ring on the harness of a fallen or otherwise incapacitated worker.

BACKGROUND OF THE INVENTION AND RELATED ART

It is common for workers employed in the construction and maintenance aspects of any heavy industry to enter into hazardous situations during their normal scope of employment. Examples of such activities include digging trenches for pipelines, entering confined spaces such as sewers or large storage tanks, and climbing on the exteriors of tall structures such as buildings, process columns, exhaust flumes or power line towers. Great efforts have been expended through the implementation of OSHA regulations to minimize the risk of such activities, and workers are now required to wear standard safety gear, follow specific safety procedures, and often must continuously monitor the surrounding environment with specialized sensors.

Regrettably, unforeseen circumstances sometimes occur or mistakes are made which render a worker incapacitated and unable to extract him/herself from a dangerous situation, and where it would be equally hazardous for rescue team members to enter and attempt to retrieve the fallen individual in person. In such circumstances it is better for the rescue team to first attempt an extraction by remotely attaching an auto-locking carabiner and safety rope to the D-ring on the fallen co-worker's safety harness and pulling the individual to safety.

This non-committal rescue is accomplished by means of a carabiner holder mounted to the end of an extension pole. The carabiner holder simultaneously grips the carabiner and holds the gate arm in an open position, allowing the user to hook the carabiner into an exposed ring or hanger. The user then manipulates the extension pole in some way, first to allow the gate arm to snap shut and lock the carabiner into position, and second to release the carabiner from the holder's grip and withdraw the extension device.

Unfortunately, the current state of the art for carabiner holders does not satisfy the needs of the safety and rescue sector. During a rescue operation, the ability to extend the reach of the rescuer in any orientation is of primary concern. But it is especially critical when the fallen worker lies downward and away from the rescuer's location, such as in a trench, down a sewer manhole, in a ventilation shaft, or lower on the face of a structure. In this orientation the weight of the rescue rope, which is often denser and heavier than typical climbing ropes, acts crosswise to the orientation to the extension pole and tends to pull the carabiner out of its holder before it can be attached to the incapacitated worker's safety harness.

Furthermore, a rescuer is likely to be nervous or agitated during an emergency and may be unable to hold the extension pole completely steady. If the rescuer does bounce the extension pole while attempting to attach the carabiner, these shocks will increase the probability that the carabiner will fall out of the holder before it can be attached to the harness. It is therefore vital that the carabiner holder be capable of securing the carabiner firmly in any orientation while supporting a substantial section of free-hanging safety rope, and at the same time withstand any additional shaking generated by nervous rescuers.

The carabiner holders presently available have been adapted from the climbing industry and are not sufficiently strong or robust enough to provide reliable operation in an emergency situation. For instance, the carabiner holder used by climbers is principally designed to extend the climber's reach directly overhead to hangers that lie beyond arm's length. In this orientation the weight of the free-hanging rope attached to the carabiner serves to better seat the carabiner into the carabiner holder. If the carabiner holder is extended too far to one side or the other, however, the weight of the rope tends to pull the carabiner out of position and causes either the carabiner's gate arm to prematurely release and snap shut, or the carabiner to fall out of the holder altogether. In a climbing situation this is not too great of an issue, as there is usually ample time for the climber to pull the carabiner back, re-attach it to the holder and try again. However, such unreliable operation in an emergency situation could prove fatal to the fallen party.

Several existing designs are also complicated to operate, as they require special manipulation of the holder when connecting the carabiner to a D-ring or hanger, or they call for twisting or pushing the extension pole to one side to release the carabiner from the holder after it has been attached to the safety harness. Such procedures may be forgotten or overlooked by a would-be rescuer in the heat of the moment, slowing down or hindering the speed of the rescue operation.

Furthermore, in the climbing industry it also is standard practice to manufacture components from lightweight plastic, thin-wall aluminum or specialized polymer fibers in order to minimize the total weight a climber must carry with him. Current carabiner holders follow this pattern, and several commercial products are made from plastic components with pieces that could easily break off if handled improperly. Industrial safety and rescue teams are not limited by such weight constraints, but instead require heavy-duty components that can withstand the rigors of an industrial work environment and still function correctly when pressed into service for the first time.

What is needed, therefore, is a carabiner holder that meets the special requirements of the safety and rescue sector. The carabiner holder must be durable and robust with the capability of withstanding some physical abuse and still providing reliable operation when an emergency situation arises. The device must also be simple to use, as rescuers can often be nervous or agitated when time constraints dictate that a fallen coworker or friend be retrieved as soon as possible. And most importantly, the holder must provide reliable operation in any orientation, and not allow the carabiner's gate arm to release inadvertently or the carabiner to fall out of the holder prematurely if the individual to be rescued is located in an awkward position.

SUMMARY OF THE INVENTION

The safety and rescue carabiner holder of the present invention is a device that overcomes the deficiencies of existing carabiner holders originally designed for recreational climbing purposes. When attached to an extension pole, it is capable of securely holding a carabiner with its gate arm in the open position while extending the user's reach several feet in any direction, all the while supporting a long and heavy segment of attached safety rope, or even the weight of a small block and tackle. The spring-loaded grip of the carabiner holder is firm enough to withstand shaking and bouncing, but will release easily after attachment by pulling the extension pole firmly backwards.

The present invention has a central bracket with an axial stem and a projecting foot assembled in the shape of an "L". This L-bracket is used for positioning and holding the base of the carabiner while a set of spring-loaded jaw arms is used to simultaneously hold the spine of the carabiner and secure its gate arm in the open position. The L-bracket and the set of jaw arms are connected by a hinge pin, and the entire device may be attached to an extension pole by way of a machine screw extending out the bottom of the L-bracket. If necessary, an insulating adaptor for high voltage tower rescue may also be attached between the carabiner holder and the extension pole.

The projecting foot on the L-bracket includes a groove in its upper surface that grasps the rounded bottom of the carabiner and prevents it from twisting out of position, despite a shifting load vector created by the weight of the freely hanging safety rope. The clamping grip generated of the set of jaw arms ensures that once the carabiner is properly positioned in the holder, it will stay in place until the carabiner is hooked into a target ring and the user tugs on the extension pole. The carabiner holder may be made with solid metal components, such as aluminum, in order to withstand the rigors and abuse of an industrial work environment.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION

Figure 1:
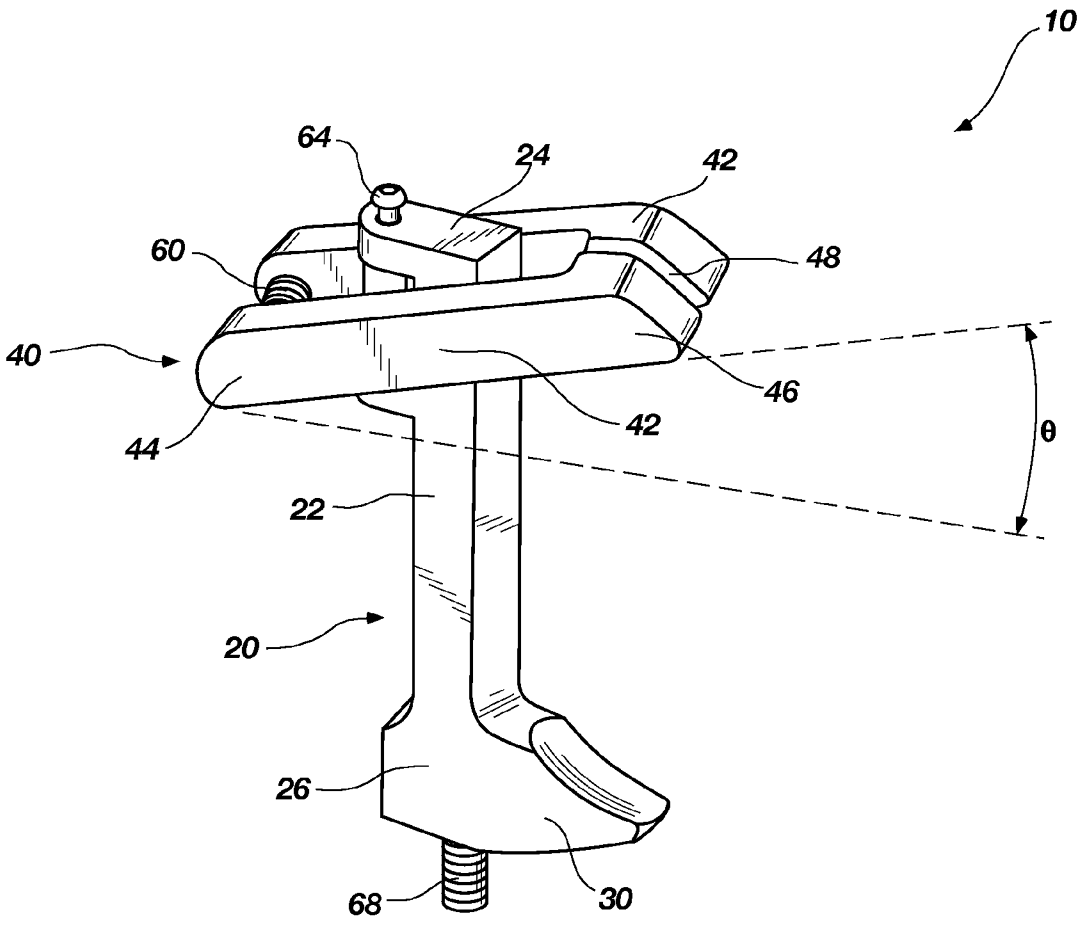
FIG. 1 is a perspective view of the safety and rescue carabiner holder according to an exemplary embodiment of the present invention.

Reference will now be made to the exemplary embodiment illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 5A:
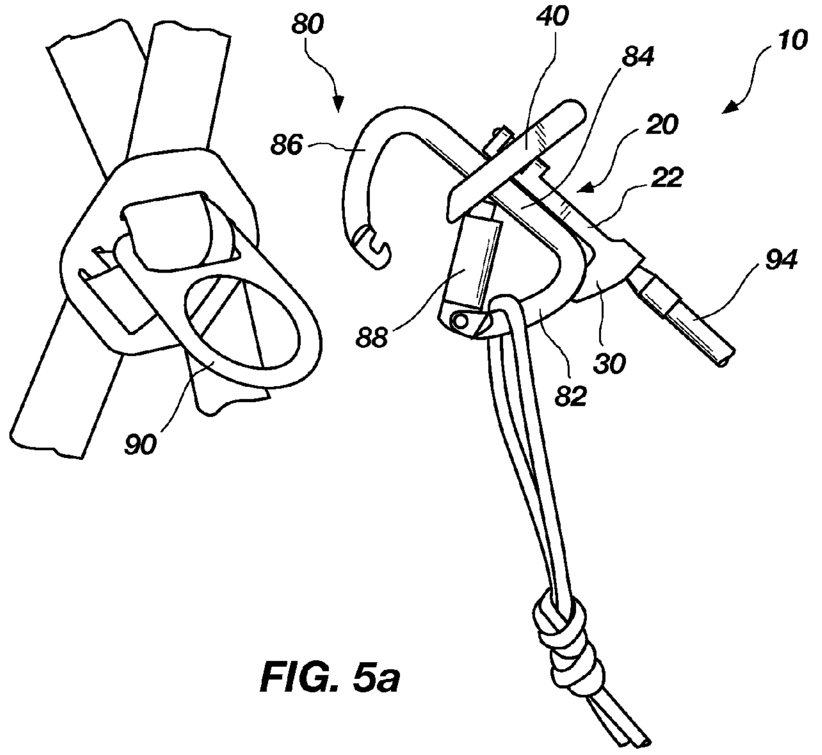
FIGS. 5*a* and 5*b* together illustrate a method of using the safety and rescue carabiner holder of FIG. 1, in accordance with another exemplary embodiment of the present invention.
Figure 5B:
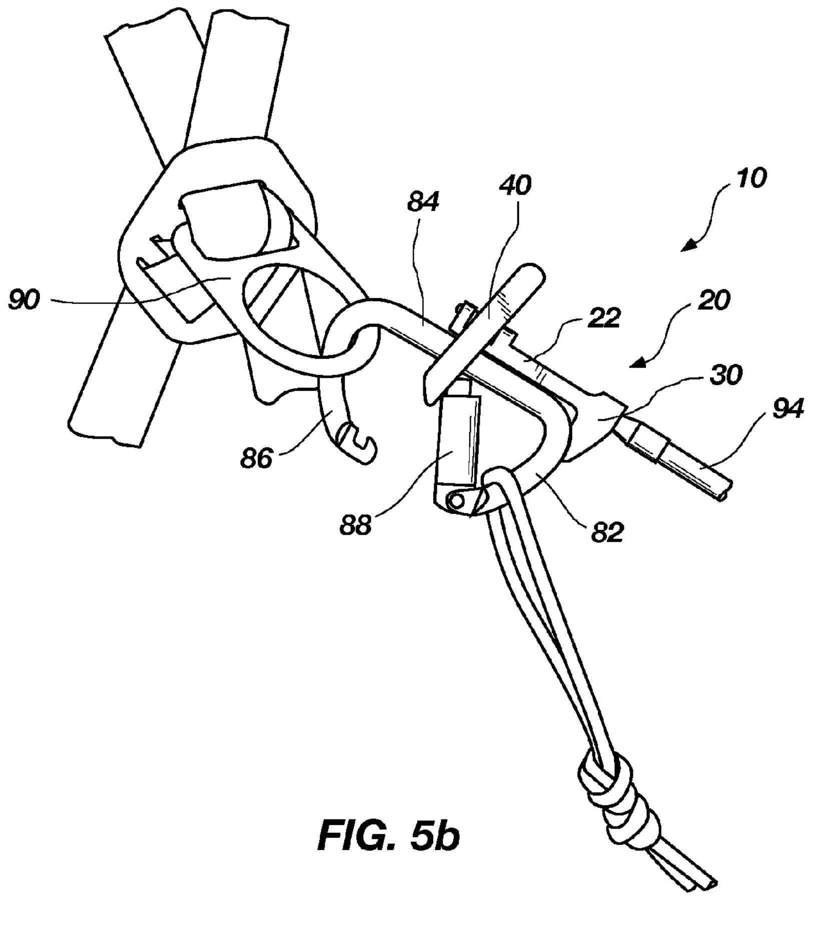

FIG. 1 illustrates a safety and rescue carabiner holder 10 according to a preferred embodiment of the present invention. The carabiner holder is comprised of two principle components: an L-bracket 20, and a gripping structure 40. The L-bracket is justly named as it has a long axial stem 22 with an upper end 24 and a lower end 26, and a projecting foot 30 which extends from its lower end. The configuration of the axial stem and the projecting foot define a quadrant of capture in which the carabiner is to be positioned. A carabiner 80 can only be orientated in one position in order for the device to operate correctly, and this occurs when the spine of the carabiner 84 contacts the axial stem 22, the base of the carabiner 82 rests on the projecting foot 30, and the gate arm of the carabiner 88 is facing away from the carabiner holder 10. (see FIGS. 5*a* and 5*b*)

While the preferred embodiment illustrated in FIG. 1 shows a projecting foot which is orientated substantially perpendicular to the axial stem, this does not preclude other embodiments in which the projecting foot assumes an angle other than 90 degrees, whether an acute angle or an obtuse angle, with the axial stem. The projecting foot may also be longer or shorter than the illustration shown in FIG. 1.

The second principle component of the present invention is the gripping structure 40. In the preferred embodiment illustrated in FIG. 1, the gripping structure is comprised of a set of separate and individual jaw arms 42, each having a rear portion 44 and a front portion 46, which are connected to the L-bracket by means of a single hinge pin 64. However, any alternative means for securing the carabiner in the quadrant of capture and for holding the gate arm in the open position is included in the scope of the present invention. For instance, the gripping structure may also be comprised of paddles or jaw arms of any shape or size which are separate from the L-bracket, or are integral with the axial stem and are cantilevered into the quadrant of capture.

The gripping structure of the preferred embodiment shown in FIG. 1 is also preloaded in a closed position by way of a coil spring 60. In a neutral, non-operational state, a small gap 48 exists between the front portions 46 of the set of jaw arms 42 that is too small for a carabiner to slip between. When installing a carabiner, this gap is opened by pinching together the rear portions 44 of each jaw arm, which simultaneously compresses the coil spring and pivots the jaw arms around hinge pin 64 to widen the gap between the front portions. The carabiner can then be inserted into the gap and positioned within the quadrant of capture. When the rear portions of the jaw arms are released, the coil spring pushes the front portions closed about the carabiner. However, the coil spring is unable to completely return to its neutral position because of the thickness of the carabiner, leaving residual compression forces in the spring that continue to force the front portions of the jaw arms against the carabiner. These clamping forces serve to hold the carabiner in place against any external load which might otherwise pull the carabiner out of position, as well as any inadvertent shaking or bouncing caused by nervous, agitated or unskilled users.

While the preferred embodiment uses a coil spring in compression to establish the preload, a coil spring in tension, a metal leaf spring, an elastomeric member, or any other component which performs the same function of preloading the set of jaw arms in the closed position falls within the scope of the present invention.

Also according to the preferred embodiment, the gripping structure is angled upward with respect to the axial stem at some angle θ. The angle allows the front portion of the jaw arms to better grip and hold the gate arm of the carabiner. However, any gripping structure which holds both the spine of the carabiner and the gate arm in the open position is understood to fall with the scope of the invention, regardless of it orientation with respect to the axial stem.

The preferred embodiment also has a mounting screw 68 which is used to attach the carabiner holder to an extension pole (not shown). The mounting screw may be installed in the bottom face of the axial stem; however, it is also to be understood that any means for securing the present invention to an extension pole, whether it is a screw, a clamp, bolts, glue, etc., falls within the scope of the present invention. An insulating adaptor for high voltage tower rescue may also be attached between the carabiner holder and the extension pole.

Figure 2:
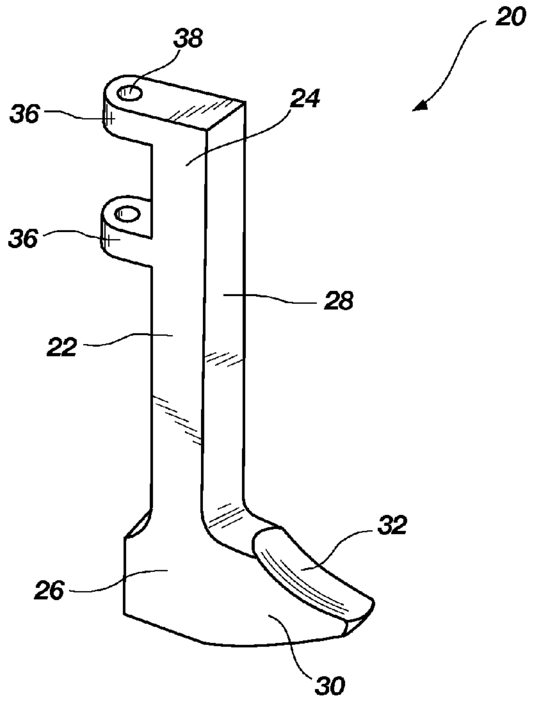
FIG. 2 is a perspective view of the L-bracket and projecting foot according to the embodiment shown in FIG. 1.

FIG. 2 is a perspective view of the L-bracket 20 according to the preferred embodiment illustrated in FIG. 1. Along with the features discussed above, the L-bracket in FIG. 2 includes a groove 32 in the upper face of the projecting foot 30. The shape of the groove substantially matches the rounded bottom of the carabiner and functions as a restraining structure which first aligns the carabiner in the quadrant of capture, and then prevents twisting and inadvertent dislodging of the carabiner during use. The groove is effective in preventing twisting because it is located towards the end the projecting foot, which in essence becomes a lever arm. At that distance, the small amount of force applied by the walls of the groove to the bottom of the carabiner is sufficient to keep the carabiner from spinning and falling out, even when the external loads are greater in magnitude than the forces imparted by the restraining structure. While a groove is used as the restraining structure in the preferred embodiment of the present invention, designs which employ other means on the end of the projecting foot to prevent a carabiner from twisting, such as pins, projections, magnets, or any other similar device or structure, are understood to fall within the scope of the present invention.

FIG. 2 also shows two protruding members 36, otherwise known as a hinge brackets, in the upper portion 24 of the axial stem. The hinge brackets receive the hinge pin 64 through holes 38 located in the hinge brackets, and are used to locate the set of jaw arms relative to the axial stem and to create an axis of rotation about which the set of jaw arms can pivot. While the hinge brackets of the present invention extend from the back face of the axial stem, opposite the projecting foot, a similar arrangement of hinge brackets could also be located on the front face 28 of the axial stem. In yet another embodiment, two sets of brackets using two hinge pins could extend from either side of the axial stem, ninety degrees from the quadrant of capture defined by the axial stem and the projecting foot. Moreover, it is not necessary for two hinge brackets to be used with each hinge pin, as one or three hinge brackets may create an equivalent axis or axes of rotation for the set of jaw arms.

Figure 3:
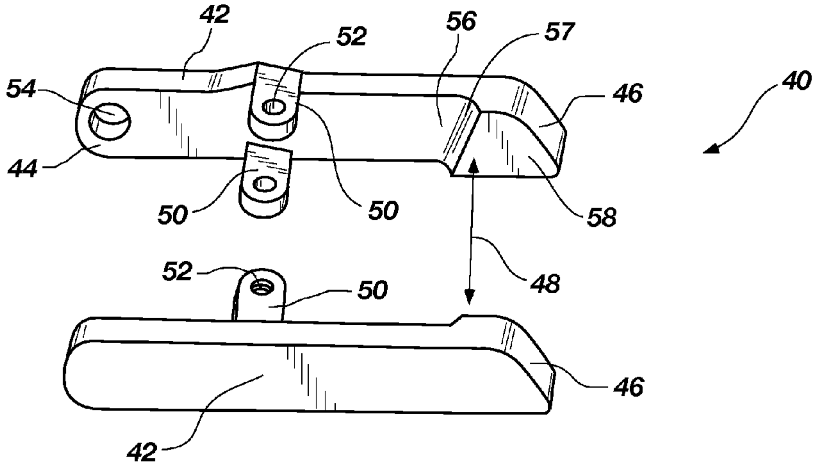
FIG. 3 is an exploded, perspective view of the gripping structure according to the embodiment shown in FIG. 1.

FIG. 3 is an exploded, perspective view of the gripping structure 40 of the preferred embodiment shown in FIG. 1. Also known as a set of jaw arms 42, the gripping structure is attached to the axial stem by way of hinge brackets 50 and holes 52 which mate with hinge pin 64 (as shown in FIG. 1) and hinge brackets 36 extending from the L-bracket (as shown in FIG. 2). The brackets and hinge pin connect to form a pivot assembly, which locates the set of jaw arms relative to the axial stem and defines as axis of rotation about which the jaw arms can pivot.

Further according to the embodiment shown in FIG. 3, each jaw arm 42 has a rear portion 44 and a front portion 46. A circular recess 54 can be installed in the rear portion of each jaw arm for receiving a coil spring 60. The inner face of the front portion of each jaw arm can be configured with a stepped face having a deeper portion 56 and a shallower portion 58. The deeper portion functions to surround and hold the spine of the carabiner in the quadrant of capture. The stepped face is deeper in this section because the carabiner's spine has a relatively larger diameter than the gate arm. Likewise, the shallower portion is used for holding the tip of the gate arm in the open position. The transition surface 57, which falls between the deeper portion and the shallower portion of the stepped face, is generally curved and smooth.

Figure 4:
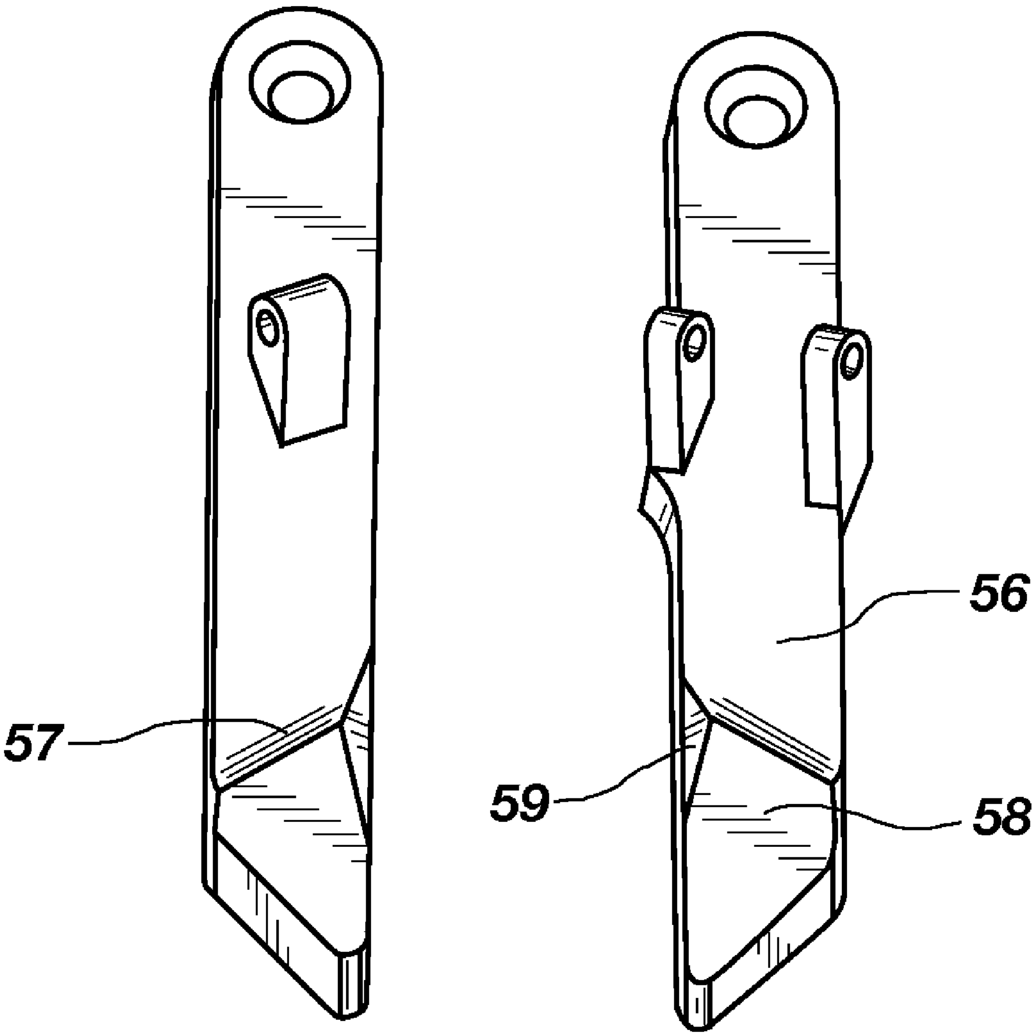
FIG. 4 is a front perspective view of the gripping structure according to the embodiment shown in FIG. 1.

The front portion of the jaw arms is further illustrated in FIG. 4, where the bottom portion of the transition surface 57 between the deeper portion 56 and the shallower portion 58 can be configured with a chamfered portion 59. When properly installed within the carabiner holder of the present invention, the gate arm of the carabiner nests with the chamfered portions of the jaw arms.

Referring back to FIG. 1, the gap 48 between the two inner faces of the jaw arms 42 is sized together with the coil spring 60 so that the gripping structure 40 provides enough clamping force when the carabiner is located in the holder 10 so that the gate arm does not prematurely release nor does the carabiner inadvertently fall out during the process of hooking the carabiner into a target, even if the user fails to keep the carabiner holder steady. However, once the carabiner has been hooked into its target the clamping force is not so great that the jaw arms fail to open when the extension pole is pulled backwards.

A method for attaching an auto-locking carabiner to a remote ring 90 or hanger is illustrated in FIGS. **5*a* and 5*b*. The method includes connecting a carabiner holder 10 to an extension pole 94, wherein the carabiner holder further comprises an L-bracket 20 pivotally connected to a set of spring-loaded jaw arms 40, and wherein the L-bracket further comprises an axial stem 22 and a projecting foot 30** and wherein each spring-loaded jaw arm further comprises a front portion and a rear portion.

The method further includes the step of opening the spring-loaded jaw arms 40 by pinching together the rear portions of the spring-loaded jaw arms to separate the front portions, followed by the step of aligning a carabiner 80 in a quadrant of capture by placing the base 82 of the carabiner in a restraining structure located on the projecting foot 30, positioning the spine 84 of the carabiner between the front portions of the spring-loaded jaw arms and against the axial stem 22 such that the gate portion 88 of the carabiner is facing away from the carabiner holder 10, opening the gate arm 88 of the carabiner such that a top section 86 of the carabiner is positioned in a hooking configuration, and engaging the carabiner holder 10 by releasing the rear portions of the spring-loaded jaw arms, allowing the front portions of the jaw arms to close about the spine 82 and the gate arm 88 of the carabiner.

The method for attaching an auto-locking carabiner further includes the steps of attaching the carabiner 80 to a remote ring 90 or hanger by extending the carabiner holder on the extension pole 90 and hooking the top section 86 of carabiner into the remote rind or hanger, and locking the carabiner 80 into the remote ring or hanger and disengaging the carabiner from the carabiner holder 10 by pulling backwards on the extension pole 94 to cause the carabiner gate arm 88 to press against the chamfered portions and create an applied force having a load vector with a significant outward component that counteracts the preload of the coil spring. As soon as the applied force exceeds the preload, the jaw arms begin to spread apart and gap 48 widens slightly. This allows the gate arm to snap shut and lock the carabiner in place. Continued backwards pulling forces the bottom of the carabiner to lift off the projecting foot and the spine of the carabiner to likewise slide out through the jaw arms, disengaging the locked carabiner from the carabiner holder entirely. As the applied force generated by an operator's arms is much greater than the preload provided by the coil spring, in practice the gate arm 88 snaps shut and the holder 10 releases the carabiner 80 at nearly the same instant.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment of the invention, it will be apparent to those of ordinary skill in the art that numerous modifications can be made without departing from the principles and concepts of the invention as set forth herein.

What is claimed and desired to be secured by Letters Patent is:

1. A carabiner holder configured for mounting on an extension pole for holding and remotely installing a carabiner comprising:

an L-bracket for defining a quadrant of capture for a carabiner, the L-bracket having an axial stem for receiving a spine portion of the carabiner and a projecting foot for receiving a bottom portion of the carabiner, the axial stem having an upper end and a lower end;

the projecting foot extending from the lower end of the axial stem and having a restraining structure for aligning the carabiner in the quadrant of capture and for preventing twisting and inadvertent dislodging of the carabiner during use, and at least one set of jaw arms mounted in the quadrant of capture for securing the carabiner in the quadrant of capture and for holding a gate arm of the carabiner in an open position; wherein the at least one set of jaw arms is preloaded in a closed position by a biasing member.

2. The carabiner holder of claim 1, wherein the at least one set of jaw arms is attached to the upper end of the axial stem.

3. The carabiner holder of claim 1, wherein the biasing member is a coil spring.

4. The carabiner holder of claim 1, wherein the at least one set of jaw arms is further configured with a stepped face having a deeper portion for surrounding and holding the spine portion of the carabiner and a shallower portion for holding the gate arm of the carabiner in the open position.

5. The carabiner holder of claim 4, wherein a transition surface between the deeper portion and the shallower portion has a chamfered surface for directing an applied releasing force to open the at least one set of jaw arms.

6. The carabiner holder of claim 1, wherein the at least one set of jaw arms is attached to the axial stem by way of a hinge pin.

7. The carabiner holder of claim 1, wherein the at least one set of jaw arms is orientated at an angle which is non-perpendicular with respect to the axial stem.

8. The carabiner holder of claim 1, wherein the restraining structure is a groove on the upper surface of the projecting foot.

9. The carabiner holder of claim 1, wherein a machine screw is attached to the lower end of the axial stem for connecting the carabiner holder to the extension pole.

10. A carabiner holder configured for mounting to an extension pole for holding and remotely installing a carabiner, comprising:

an L-bracket for receiving and positioning a carabiner, further comprising:

an axial stem having an upper end and a lower end and being configured to receive and support a spine portion of the carabiner;

at least one protruding member extending from the upper end of the axial stem and configured to receive a hinge pin; and a projecting foot extending laterally from the lower end of axial stem and having a groove in its upper face for aligning the carabiner in a quadrant of capture and for preventing twisting and inadvertent dislodging of the carabiner during use, and a set of jaw arms attached to the upper end of the axial stem for holding a gate arm of the carabiner in an open position, wherein the set of jaw arms has at least one jaw arm further comprising:

a rear portion configured to receive a coil spring;

a middle portion configured to receive a hinge pin; and a forward portion with a stepped face being configured for securing the carabiner in the quadrant of capture and holding the gate arm of the carabiner in an open position; and wherein the set of jaws is attached to the L-bracket with a hinge pin.

11. A method for attaching an auto-locking carabiner to a remote ring or hanger comprising:

connecting a carabiner holder to an extension pole, the carabiner holder further comprising an L-bracket pivotally connected to a set of preloaded jaw arms preloaded in a closed position by a biasing member, wherein the L-bracket further comprises an axial stem and a projecting foot and wherein each preloaded jaw arm further comprises a front portion and a rear portion;

opening the preloaded jaw arms by pinching together the rear portions of the preloaded jaw arms to separate the front portions;

aligning a carabiner in a quadrant of capture further comprising:

placing the base of the carabiner in a restraining structure located on the projecting foot;

positioning the spine of the carabiner between the front portions of the preloaded jaw arms and against the axial stem such that the gate portion of the carabiner is facing away from the carabiner holder;

opening the gate arm of the carabiner such that a top section of the carabiner is positioned in a hooking configuration; and engaging the carabiner holder by releasing the rear portions of the preloaded jaw arms, allowing the front portions of the jaw arms to close about the spine and the gate arm of the carabiner;

attaching the carabiner to a remote ring or hanger by extending the carabiner holder on an extension pole and hooking the top section of carabiner into the remote ring or hanger; and locking the carabiner into the remote ring or hanger and disengaging the carabiner from the carabiner holder by releasing the gate arm and the spine of the carabiner from the front portion of the preloaded jaw arms, allowing the gate arm to snap shut around the remote ring or hanger and further allowing the entire carabiner to uncouple from the carabiner holder.

12. The method of claim 11, wherein the biasing member is a coil spring.

13. The method of claim 11, wherein locking the carabiner into the remote ring or hanger and disengaging the carabiner from the carabiner holder further comprises pulling backwards on the extension pole to create an applied releasing force.

14. The method of claim 13, wherein the front portions of the preloaded jaw arms are configured with a stepped face having a deeper portion for surrounding and holding the spine of the carabiner and a shallower portion for holding the gate arm of the carabiner in the open position, and wherein a transition surface between the deeper portion and the shallower portion has a chamfered surface for directing the applied releasing force to open the set of spring-loaded jaw arms.

15. The method of claim 11, wherein the set of preloaded jaw arms is pivotally connected to the axial stem by way of a hinge pin.

16. The method of claim 11, wherein the set of preloaded jaw arms is orientated at an angle which is non-perpendicular with respect to the axial stem.

17. The method of claim 11, wherein the restraining structure is a groove on the upper surface of the projecting foot.

18. The method of claim 11, wherein a machine screw is attached to the lower end of the axial stem for connecting the carabiner holder to the extension pole.

* * * * *